(No Model.) 3 Sheets—Sheet 1.
J. W. CLOUD.
MEANS FOR COOLING STEEL TIRES OR RINGS.
No. 468,789. Patented Feb. 16, 1892.
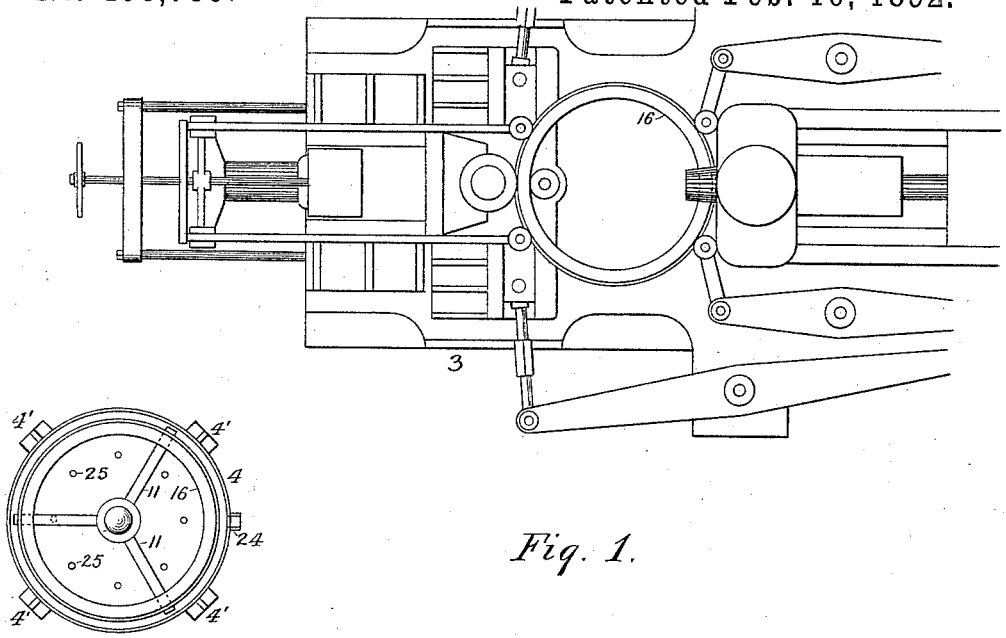
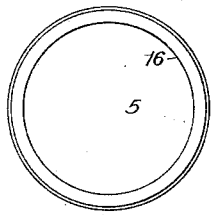
*Fig. 1.*
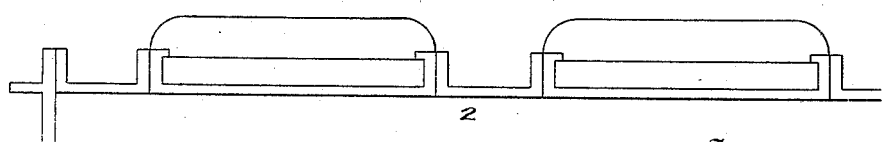
Witnesses
Charles E. Tetley
H Haupt Jr
Inventor
Jno W Cloud
By his Attorneys
Haupt Brothers
THE NORRIS PETERS CO., PHOTO-LITHO., WASHINGTON, D. C.

(No Model.)  3 Sheets—Sheet 2.

J. W. CLOUD.
MEANS FOR COOLING STEEL TIRES OR RINGS.

No. 468,789. Patented Feb. 16, 1892.

Witnesses
Charles E. Tetley
H. Haupt Jr.

Inventor
J. W. Cloud
By his Attorneys
Haupt Brothers (No Model.) 3 Sheets—Sheet 3.
J. W. CLOUD.
MEANS FOR COOLING STEEL TIRES OR RINGS.

No. 468,789. Patented Feb. 16, 1892.

UNITED STATES PATENT OFFICE.

JOHN W. CLOUD, OF CHICAGO, ILLINOIS.

MEANS FOR COOLING STEEL TIRES OR RINGS.

SPECIFICATION forming part of Letters Patent No. 468,789, dated February 16, 1892.

Application filed November 28, 1890. Serial No. 372,336. (No model.)

*To all whom it may concern:*

Be it known that I, JOHN W. CLOUD, a citizen of the United States, residing in Chicago, in the county of Cook and State of Illinois, have invented a new and useful Improvement in Means for Cooling Steel Tires or Rings, of which the following is a specification.

My invention relates to means for cooling steel tires and rings in which the steel tire or ring is taken from the furnace, grasped by means of a traveler on a swinging crane, carried to the rolls and shaped, then by the same crane carried to a cooling-bath in which it is immersed by the lowering of a supporting-frame holding the tire or ring and which is provided with means for rotating the said tire or ring, and when sufficiently cooled the frame and tire or ring are raised and the crane again grasping the tire or ring carries it forward to the cooling-beds.

The object of my invention is to provide a means for rapidly cooling a tire or ring after it has been taken from the furnace and rolled and shaped through any desired degrees of temperature by immersing it in a bath of fluid and securing in the tire or ring a uniformity of texture by revolving the same while cooling in the said bath. I attain this object by means of the apparatus shown in the accompanying drawings and the process herein described.

Figure 2:
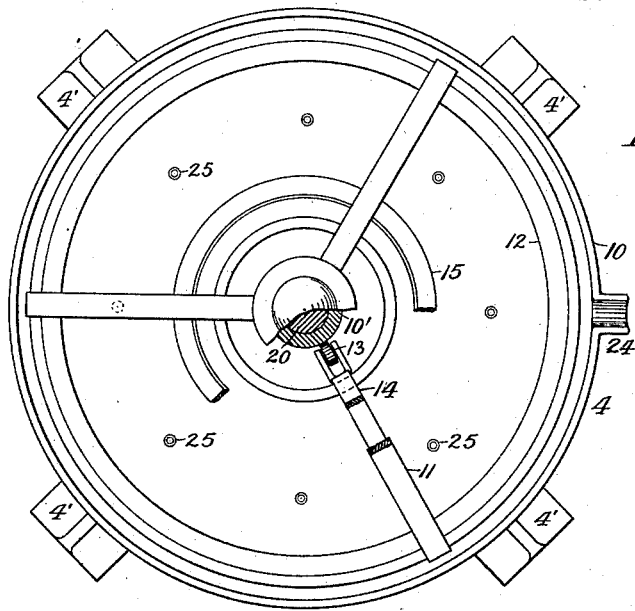
Figure 3:
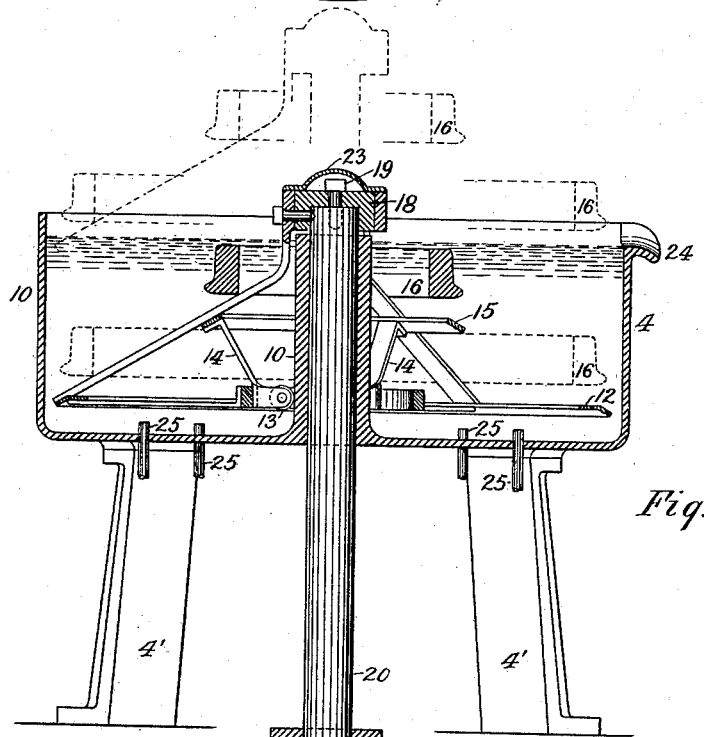
Figure 4:
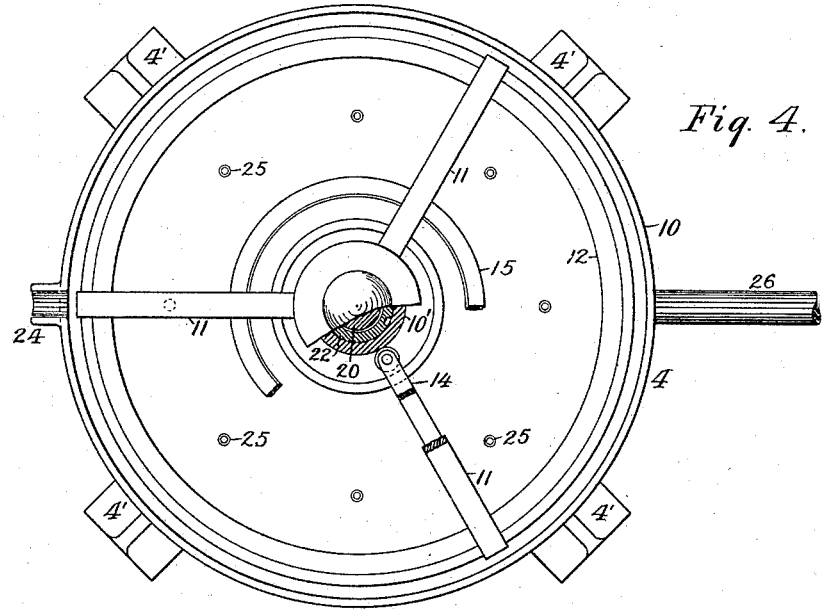
Figure 5:
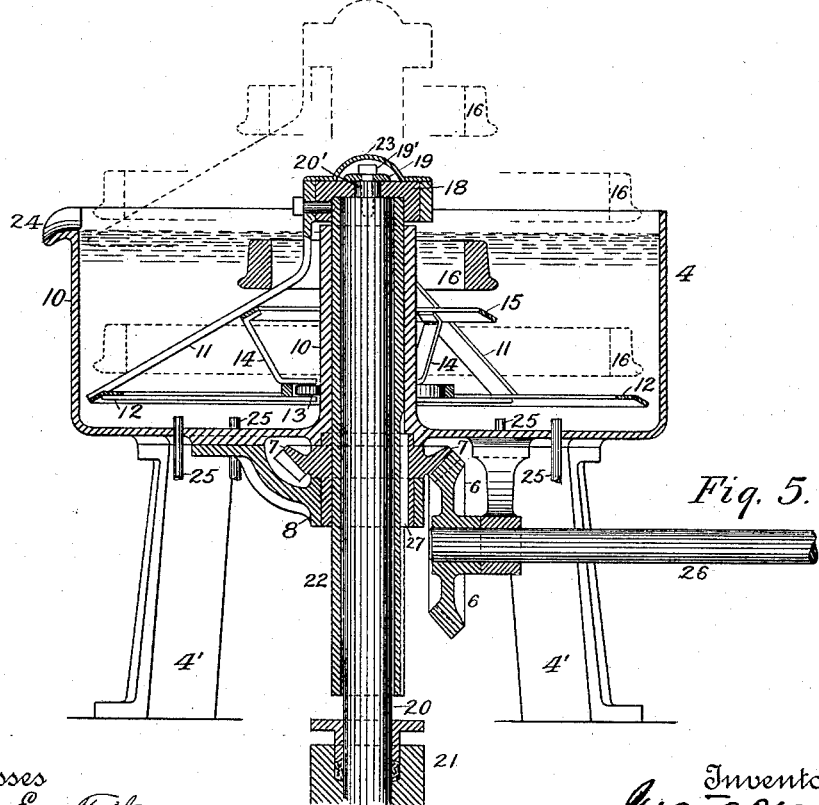

In the drawings, Figure 1 is a plan view of my apparatus, showing the relative positions of the furnace, rolls, cooling-tank, and cooling-beds in an arc of a circle. Fig. 2 is a plan view of one form of the cooling device, showing the device for supporting the tire or ring without revolving it during immersion. Fig. 3 is a vertical sectional view of the cooling device without the rotating mechanism. Fig. 4 is a plan view of the cooling device, showing the means for revolving the same. Fig. 5 is a vertical sectional view of the cooling device, showing the means for revolving and immersing the tire or ring.

Similar figures refer to similar parts throughout the several views.

At a convenient point between the furnace 2 and any suitable rolls 3 for rolling tires or rings, I erect a swinging crane 1, and within the radius of the crane 1 I construct a cooling-bed 5 and a cooling-tank 4, supported by the supports 4'. Upon the supports 4' I construct a tank 10, which carries within it a central cylinder 10', at a convenient point beneath the tank 10. Referring to Figs. 4 and 5, I make a sleeve 8, which carries the beveled cog-wheel 7, having feather 27, which is arranged to slide in a groove in cylinder 22. Secured to the bottom of the tank or other suitable place is a bracket or hanger supporting a beveled cog-wheel 6, to which motion is imparted by the shaft 26.

Within the cylinder 10' in the tank 10 is a second cylinder 22, which slides up and down on the feather 27 of cog-wheel 7. The cylinder 22 extends upward beyond the top of the tank 10 and supports upon its summit the cap 18. The cap 18 bears bent radial arms 11, which extend downward and outward from the cap 18 into the embrace of the tank 10. Their object is to support the tire or ring to be cooled. At convenient points to the arms 11 are secured stay-rings 15 and 12, which secure one arm 11 to the next arm 11, and so securing them all together to give rigidity to the frame. Extending from the stay-ring 12 at convenient points to the diagonal brace 14 and arms 14', which carry on their inner ends, which are prolonged beyond the diagonal brace 14, a roller 13, which is secured to the arm 14' in such a manner that it will assist the arm 14' in traversing about the cylinder 10' in a horizontal or vertical direction, as the case may be, and the said roller 13, braced by the diagonal braces 14.

Within the cylinder 22 is the plunger 20 of an hydraulic press 21. On the summit of the plunger 20, which is vertical, is a lug 20', which enters a hole in the cap 18. The cap 18 is secured to the plunger 20 by the plate 19 and screw 19', and over the end of the device is a cap 23 to protect the parts.

Figs. 2 and 3 show a modified form of the device in which the cog-wheel gearing and cylinder 22 is omitted from the mechanism, as in this form it is not thought advisable to rotate the tire, but simply immerse it by an up-and-down motion.

In the tank at a convenient point I make the inlet-pipes 25 and the overflow-pipe 24 to insure a current of fluid.

Having thus described the parts of my invention, I now proceed to explain the method of operating the same. The parts are adjusted together so that the tank 10 shall be properly supported over the supports 4', and the plunger 20 shall support the cap 18 and the arms 11, and the cylinder 22 be in gear with the cog-wheels 6 and 7 and the shaft 26. The cooling device 4 is placed at a convenient point relative to the crane 1, furnace 2 rolls 3, and cooling-beds 5, and when so arranged my process consists in taking a tire or ring 16 from the furnace 2, swinging it with the crane 1 to the rolls 3, shaping it in the said rolls, and, while still hot, lifting it with the crane and placing the tire or ring 16 upon the arms 11 of the cooling device 4. I then remove the crane 1 and impart a rotary motion to the shaft 26 by proper means, which revolves the tire or ring 16 horizontally about its axis through the medium of the cog-wheels 6 and 7, feather 27, and the cylinder 22. While thus revolving, the press 21 is operated to depress the plunger 20 with the arms 11, cap 18, and tire or ring 16, and the tire or ring 16 is immersed in the cooling-fluid to any desired degree, the rotation of the tire or ring being continued at any rate of speed desired. The roller 13, running against the cylinder 10', relieves any friction of rotation at that point. A constant current of fluid is, if necessary, maintained by the influx and afflux pipes 25 and 24. When the cooling of the tire or ring 16 has advanced sufficiently, the press 21 is operated to raise the tire or ring 16 and arms 11 out of the bath and the shaft 26 is stopped. The tire or ring 16 is then taken by the crane 1 and lifted and deposited on the cooling-floor 5 to become cold. In cases of small tires or rings or where it is not desired to rotate the tire or ring while cooling the simple form of apparatus indicated in Figs. 2 and 3 is used.

I am aware that prior to my invention tires and rings have been somewhat cooled by jets of water thrown upon them while being rolled, and I do not claim the cooling in the broad sense; but What I do claim, and desire to secure by Letters Patent, is—

1. In means for cooling steel tires or rings, a series of arms for sustaining the tire or ring within a cooling-tank, and a cooling-tank, the said arms having rollers rolling against the hollow cylinder, combined with a central shaft, a central hollow cylinder surrounding said shaft, the central shaft carrying the said series of arms, a series of beveled cog-wheels, and shafts to impart rotary motion to the central shaft, all substantially as and for the purpose set forth.

2. In means for cooling steel tires or rings, the central shafts and cap for sustaining the supporting-arms, the supporting-arms to carry the tire or ring, a cooling-tank arranged beneath the said arms, the means for raising and lowering the said shaft and arms, and rollers carried by the horizontal part of the sustaining-arms rolling against a central hollow cylinder surrounding the said central shaft of the cooling-bath, and the said central cylinder, all substantially as and for the purpose set forth.

3. In means for cooling steel tires or rings, the central shaft carrying a cap and sustaining-arms with rollers supported by said arms and rolling against a hollow cylinder, said shaft being provided with a slot to accommodate a feather attached to a cog-wheel, the said shaft moving within the central hollow cylinder of the cooling-tank, the said hollow cylinder, and a feather working within said slot, and the cog-wheel for imparting rotation to the said shaft, cap, sustaining-arms, and tire or ring, all substantially as and for the purpose set forth and described.

JNO. W. CLOUD.

In presence of—
H. HAUPT, Jr.,
CHARLES E. TETLEY.